Nov. 19, 1929.                C. A. STENVIG                1,736,227
                         APPARATUS FOR DRYING FIELDS
                           Filed Sept. 11, 1926        2 Sheets-Sheet 1
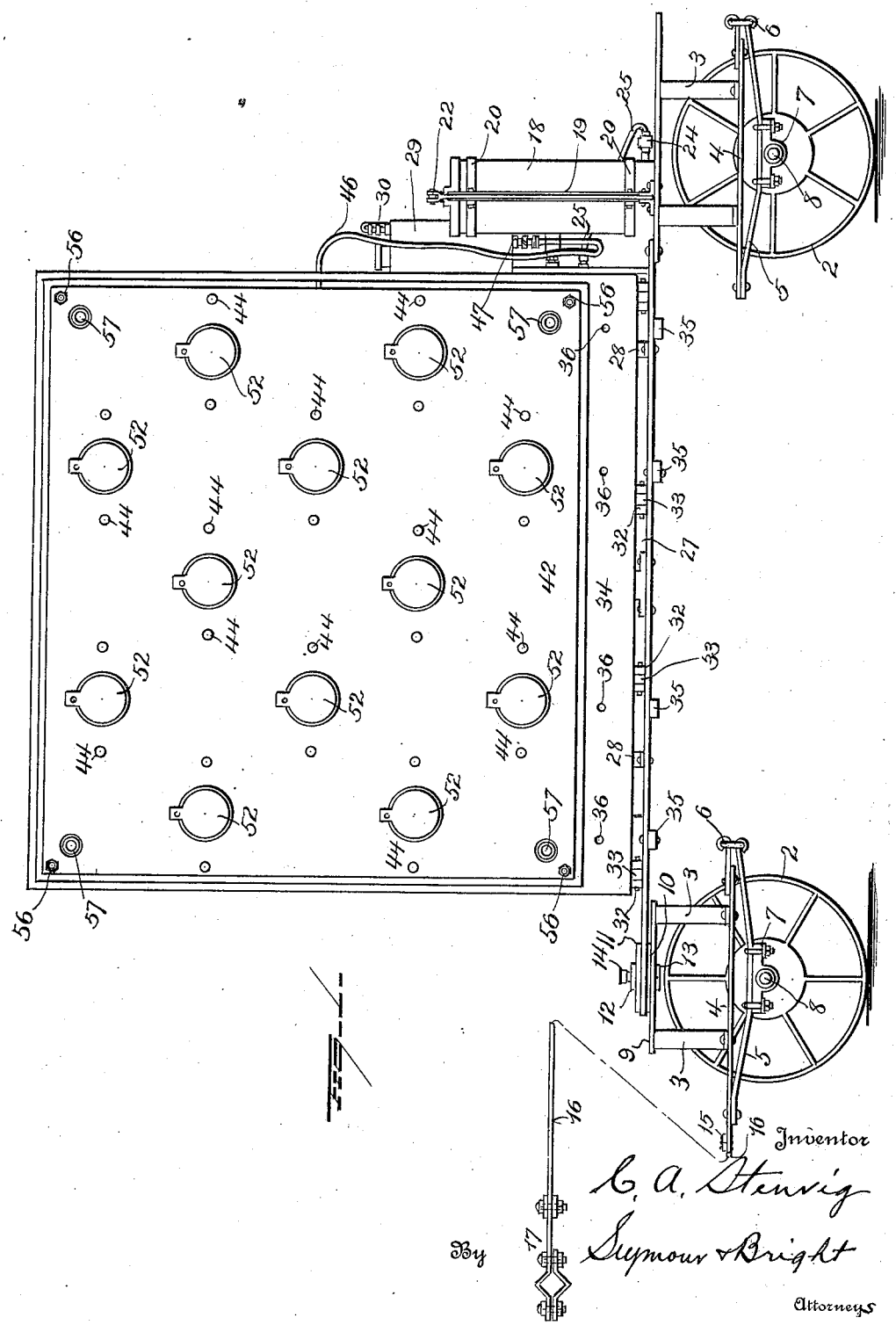

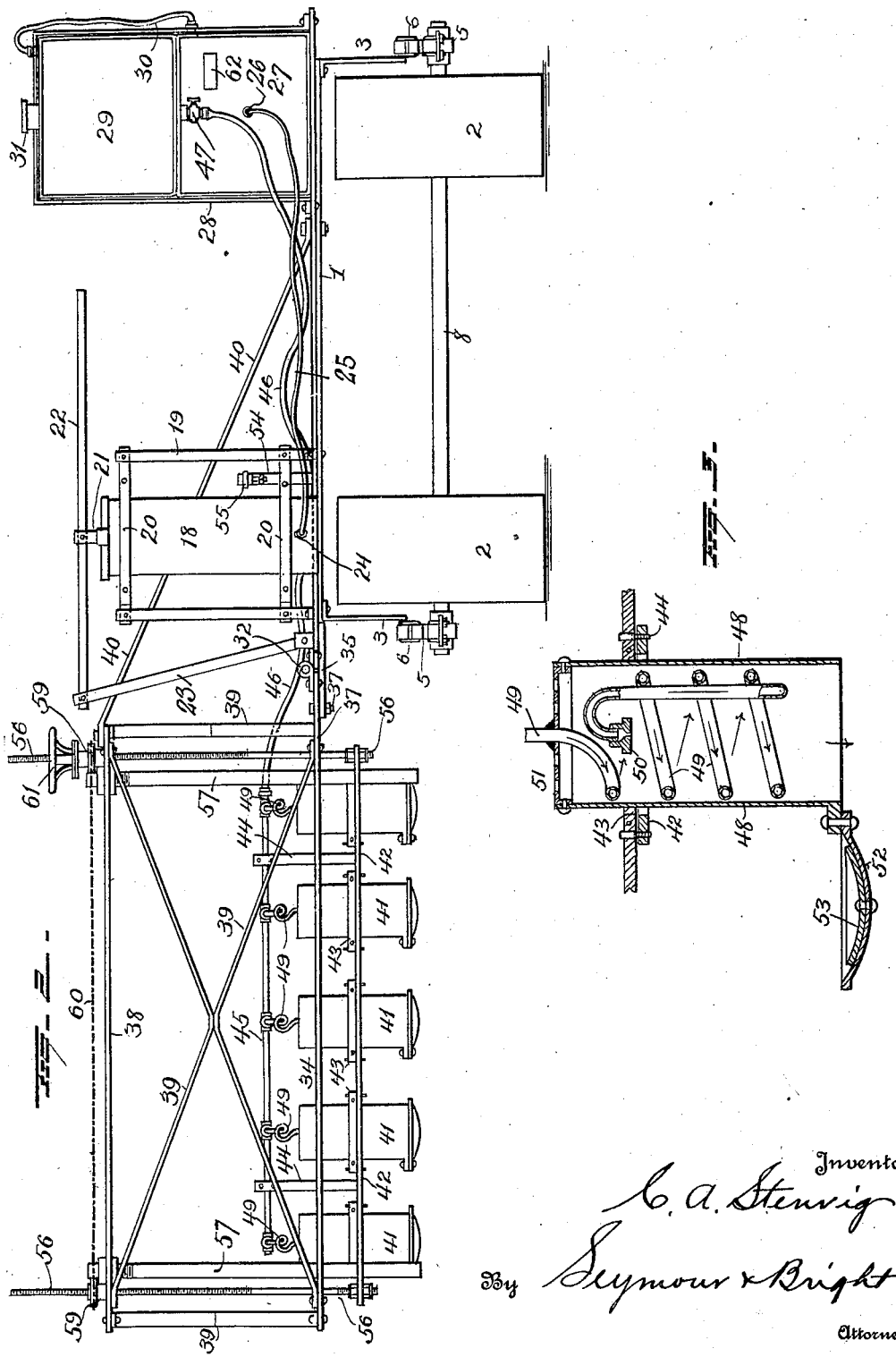

Patented Nov. 19, 1929

1,736,227

UNITED STATES PATENT OFFICE

CARL A. STENVIG, OF BELLINGHAM, WASHINGTON

APPARATUS FOR DRYING FIELDS

Application filed September 11, 1926. Serial No. 134,905.

This invention relates to an apparatus for drying ground and is intended more particularly for drying athletic fields after a rain, but it may be used to soften frozen ground and take out the moisture and may be advantageously employed in cities for melting snow which obstructs traffic. The invention is illustrated in the accompanying drawings and will be hereinafter fully set forth.

In the drawings, Figure 1 is a side elevation of an apparatus embodying the invention as it appears when not in use and arranged for storage or travel to a point of use;

Figure 2 is a rear elevation showing the machine arranged for use;

Figure 3 is a section of a burner on an enlarged scale.

In carrying out my invention, I provide a platform 1 which may be of any convenient dimensions and is preferably rectangular in form. The platform may be an open flat frame and it is supported at both front and rear by wheels 2 which preferably have tread surfaces of appreciable width so that they will not cut into the ground. To the sides of the platform, at or near the rear end thereof, I secure the depending brackets 3 to the lower ends of each pair of which is secured the spring bar 4, a spring 5 being secured at its front end to the front end of the respective bar and having its rear end connected with the rear end of the bar by a shackle 6. Midway the lengths of the springs, bearings 7 are secured thereto and the axle 8 is journaled in these bearings, the wheels being secured upon the axle. The front wheels are mounted in the same manner except that a fifth wheel is interposed between the brackets 3 and the platform, the brackets being secured at their upper ends to upper side bars 9 which are connected by a cross bar 10 upon which the front end of the platform rests. An upper bar or plate 11 is disposed over the front end of the platform and a king bolt 12 is fitted through said plate, the platform and the bar 10 to pivotally connect the front end of the platform to its support. A retaining collar 13 is secured on the king bolt below the cross bar 10 and an oil cup 14 may be carried by the upper end of the bolt. The front ends of the front side spring bars 4 are connected by a cross bar 15 to which the tongue or draft pole 16 is secured and the tongue may be provided at its front end with any convenient or approved means, indicated generally at 17, for the application of motive power.

An air-compressor 18 is mounted on the platform at the rear end thereof and is held rigidly in place by a frame consisting of standards 19, secured firmly to and rising from the platform at the sides of the compressor, and clamps 20, clasping the compressor near the top and bottom thereof and secured at their ends to the standards. The compressor may be of any preferred construction but is illustrated as of the reciprocatory type, a portion of a plunger or piston rod being shown at 21 connected to a hand lever 22 which is fulcrumed upon a rocking standard 23 mounted in any convenient manner upon the platform. The outlet 24 of the compressor is connected by a hose 25 with the inlet 26 of a reservoir 27 disposed along one side of the platform and held thereon by an anchoring frame 28. A fuel tank 29 rests on the reservoir and is held against displacement by the same frame 28, a short hose 30 connecting the reservoir with the tank, and the tank being provided with a filling cap indicated at 31.

Secured upon the platform, along the side remote from the tank and reservoir, are the hinge leaves 32 to which are pivotally attached the mating hinge leaves 33 secured to a burner frame 34. Stop and lock plates or lugs 35 are secured to the platform and project beyond the side of the same, and the burner frame is provided with openings 36 corresponding in arrangement with said plates or lugs so that, when the burner frame is swung down to operative position as shown in Fig. 2, bolts 37 may be inserted through the openings 36 and said lugs and plates so that the burner frame will be firmly supported in the desired position and the strain upon the hinge pins minimized. The burner frame 34 is connected with a screw-supporting frame 38 by braces 39 which reenforce the structure so that the required rigidity is attained, both frames having the rectangular form shown in Fig. 1 and the braces being disposed diagonally at all four sides of the rectangle. When the burner frame is lowered for use, an additional brace 40 is extended between and secured to the platform 1 and the frame 38.

The burners 41 are mounted in a burner platform 42 through openings provided therefor in the platform. Clamping collars 43 are fitted around the burners and are firmly secured to the platform 42 by screws 43. Secured to and extending from the platform 42 are arms 44 which carry a fuel pipe 45 connected by a hose 46 with the valved outlet 47 of the fuel tank, it being understood that there is a main fuel pipe connected directly with the hose and a branch pipe for each row of burners. Each burner consists of a cylindrical casing 48 which is disposed vertically when in operation and around which the clamping collars 43 are secured, and a coiled vaporizing tube 49 housed within the casing and tapped at one end into the fuel pipe 45 while its opposite end carries a jet tip 50. The upper end of the casing 48 is permanently closed by a perforated cap 51 while the lower end is provided with a laterally swinging pivoted head 52 which is dished and equipped with an asbestos lining 53 whereby it may be utilized as an ignition cup.

Upon the platform 1 is a rest 54 equipped with a clamp 55. When the device is not in use, the innermost brace 39 or the side of the frame 38 will impose its weight on the rest 54 and may be secured by the clamp 55.

Secured in each corner of the burner platform 42 is one end of an adjusting screw 56 and adjacent each screw a guide 57 is secured to the screw supporting frame 38 and passes through openings provided therefor in the frame 34 and the platform 42. Engaged with the upper end portion of each screw 56 is a nut 59 having a sprocket formed thereabout, and a sprocket chain 60 is trained about all the sprockets whereby synchronous movement of the sprockets will be attained to adjust the burners to the most advantageous distance from the ground. One of the nuts 59 has a handwheel 61 secured to its upper end to facilitate the adjustment.

In starting the operation, after the burners have been properly adjusted, the outlet 47 of the fuel tank is opened until all the fuel pipes have been filled and fuel has discharged from the tips 50 to fill the ignition pans 52, it being assumed that the pressure gage 62 on the reservoir shows the proper working pressure therein. The oil in the ignition pans is ignited and the pans then each swung to closed position so that the flames will play directly upon and about the coiled pipes within the respective casings 48. Said pipes will, consequently, be so raised in temperature that the fuel therein will be thoroughly vaporized and will at once ignite upon issuing from the tip 50. Of course, when the vaporizing temperature has been reached, the lower ends of the burner casings will be uncovered so that the flame may pass to and play upon the ground.

It will be noted that the burner frame is disposed at the side of the truck when arranged for use, and it will be understood that the machine is to be moved over the ground so that the surface will be subjected to the drying influence of the heat from the burners. By starting at an edge of the playing field and working around the field and gradually in toward the center it will be possible to dry the entire field without carrying the wheels onto soft ground to form ruts therein. The machine will burn any hydrocarbon or similar fuel, may be easily adjusted and manipulated, and will operate efficiently to rapidly dry a field so that it will be fit for use. The asbestos lining of the ignition cups serves to hold the fuel so that it will burn more efficiently than if the lining were not provided.

Having fully described my invention what I claim as new and desire to secure by Letters-Patent, is:—

1. The combination of a portable support, a burner frame carried by the support and adapted to project at the side thereof or extend upwardly thereover, a burner platform, a plurality of burners carried by the burner platform, guides extending from the burner frame in engagement with the burner platform, and means for effecting movement of the burner platform toward or from the burner frame.

2. The combination of a portable support, a movable burner frame carried by the portable support to project laterally therefrom or extend upwardly thereabove, a burner platform slidably mounted for movement toward and from the burner frame, a plurality of burners mounted in the burner platform, adjustment screws secured to the burner platform and extending therefrom through the burner frame, and means on the burner frame for synchronously adjusting the screws.

In testimony whereof, I have signed this specification.

CARL A. STENVIG.